A. Exton,
Bread Machine,
N° 52,036. Patented Jan. 16, 1866.

Witnesses;

Inventor;
Adam Exton

UNITED STATES PATENT OFFICE.

ADAM EXTON, OF TRENTON, NEW JERSEY.

APPARATUS FOR MAKING SCROLL-BISCUIT.

Specification forming part of Letters Patent No. 52,036, dated January 16, 1866.

*To all whom it may concern:*

Be it known that I, ADAM EXTON, of Trenton, in the county of Mercer and State of New Jersey, have invented a new and useful Improvement in Apparatus for Making Scroll-Biscuit; and I do hereby declare that the following is a full, clear, and exact description thereof, which will enable those skilled in the art to make and use the same, reference being had to the accompanying drawings, forming part of this specification, in which—

Figure 1:
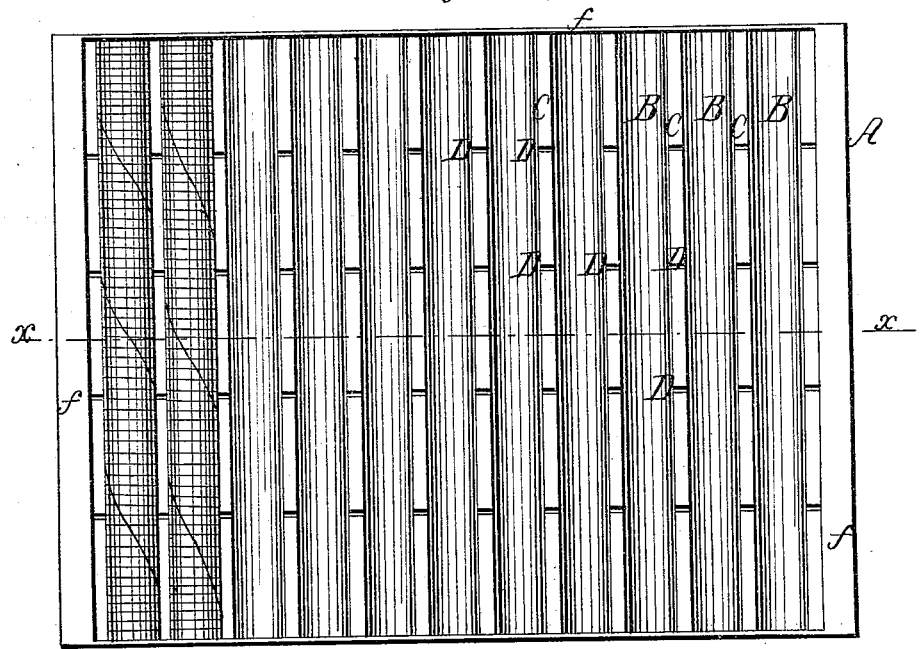
Figure 2:
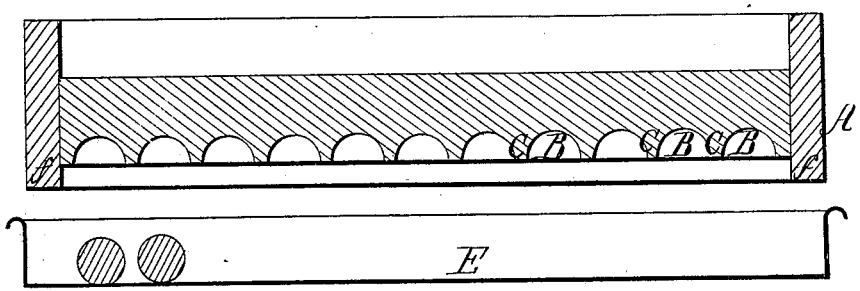

Figure 1 is a plan view of an apparatus made according to my invention. Fig. 2 is a vertical section taken on the line $x$ of Fig. 1, the same figure showing also a section of a pan.

Similar letters of reference indicate corresponding parts.

The object of this invention is to facilitate the making of scroll-biscuit.

It consists in the construction and use of a former made of wood or other suitable material, the face or upper surface of which is grooved to receive rolls of biscuit, the grooves being separated one from the other by ridges which are left between them. The grooves extend clear across the former, and the tops of the ridges are marked across by shallow depressions or incisions, which indicate the lines for dividing the rolls into biscuits of equal length. All the grooves of the former are to be filled with rolls after they have been twisted into scroll form, and the rolls are then partially divided into sections of suitable length to form them into biscuit. The pan in which they are to be baked is then inverted and placed over the former, when both are seized and turned over so as to bring the pan beneath, and on removing the former the rolls are left lying in the pan parallel with each other, separated from each other a sufficient distance to prevent their sides coming in contact while they are being baked, those sides which are partly cut or divided being next to the bottom of the pan.

Scroll-biscuit is a species of cracker, so called because the rolls of which it is made are twisted just before they are placed in the pans to be baked, in order to prevent them from cracking open and splitting during the process of baking.

I do not claim in this application forming or cutting the dough into long rolls, nor do I claim twisting the rolls; but my improvement relates to the construction and use of the former herein described.

A is a former, of rectangular shape, across which are numerous grooves or semicircular depressions, B, separated from each other by ridges C of considerable width. The width of these grooves and their depth are to be such as to equal the diameter of the unbaked rolls, so as to permit them to lie easily in the grooves. The rolls are laid in the grooves as soon as they are twisted, and they will not have the same tendency to become untwisted when they are placed in said grooves that they do when placed on the bottom of a pan or other plain surface, because the grooves embrace about one-half of their circumference.

The letters D designate marks or depressions which are made across the ridges C from one end of the former to the other for the purpose of marking out the places for dividing the rolls into biscuits of the desired length. In this example of my invention there are four series of marks, D, across the ridges. When the grooves are all filled the baker cuts the rolls with a knife or other suitable instrument across those parts which are above the level of the ridges, being guided by the marks or depressions D, aforesaid. The cut thus made across the rolls will enable one to divide the rolls on the application of a slight force after they are baked. When the rolls have been cut across, as above stated, they are ready to be placed in a pan to be baked. It is desirable that biscuit of this character shall keep its twisted shape while being baked, to prevent them from becoming split apart when expanding in the oven, and it is also desirable that the rolls be kept separated from each other, so as not to come in contact during the baking operation. I accomplish both these objects by means of my former, and also thereby greatly facilitate the work of panning the rolls.

E designates a baking-pan of rectangular outline, but larger in width and length than the former, so that the latter can be received within its sides. Such a pan is inverted and laid down over the former, whose ends and sides $f$ are raised above the level of the ridges D just enough to bring the said ends and sides level with the upper surfaces of the rolls as the latter lie in the grooves D. This construction and provision preserves the rolls from being crushed and flattened when the pan is brought down on the former. The workman next seizes the former and pan, and turns them over, so as to bring the pan beneath the former, when the latter is removed, leaving the rolls lying on the bottom of the pan in proper order for being baked, each separated from the adjacent rolls by a space equal to the width of the ridges C. Moreover, their cut or indented surfaces are now next to the pan, and the several sections of biscuit will not become untwisted wholly or partly, as they might do if their indented sides were uppermost. The rolls are now ready for the oven.

Fig. 2 represents the former raised up above the pan when being removed from the pan after the rolls have been deposited therein.

I claim as new and desire to secure by Letters Patent—

1. The former above described, for preparing scroll-biscuit for the oven, constructed with grooves separated from each other by ridges or raised spaces, and operated substantially as set forth.

2. Making a series of marks or depressions across the tops of the ridges at right angles with them and at such distances as shall equal the length of the divisions of the biscuit, substantially as and for the purpose above set forth.

ADAM EXTON.

Witnesses:
MORRIS MATTHEWS,
WM. C. HOWELL.